United States Patent
Stine et al.

(10) Patent No.: US 6,840,126 B1
(45) Date of Patent: Jan. 11, 2005

(54) AUTOMATIC RANGE UP-SHIFT CONTROL AND METHOD OF OPERATION

(75) Inventors: Al C. Stine, Kalamazoo, MI (US); Michael E. Lemon, Battle Creek, MI (US); David L. Wadas, Kalamazoo, MI (US); Yeidei Wang, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/629,818

(22) Filed: Jul. 29, 2003

(51) Int. Cl.[7] ............................................... F16H 59/00
(52) U.S. Cl. ..................................................... 74/336 R
(58) Field of Search ............................. 477/78; 74/745, 74/336 R (56) References Cited

U.S. PATENT DOCUMENTS

| | | |
|---|---|---|
| 3,429,202 A | 2/1969 | Camille |
| 4,361,060 A | 11/1982 | Smyth |
| 4,361,065 A | 11/1982 | Wilcox et al. |
| 4,455,883 A | 6/1984 | Radcliffe |
| 4,550,627 A | 11/1985 | Lauer et al. |
| 4,561,325 A | 12/1985 | Jester |
| 4,595,986 A | 6/1986 | Daubenspeck et al. |
| 4,663,725 A | 5/1987 | Truckenbrod et al. |
| 4,754,665 A | 7/1988 | Vandervoort |
| 4,920,815 A | 5/1990 | Reynolds |
| 5,000,060 A | 3/1991 | Reynolds et al. |
| 5,222,404 A | 6/1993 | Stine |
| 5,261,288 A * | 11/1993 | Menig ........................ 74/335 |
| 5,272,931 A | 12/1993 | Daniel |
| 5,335,566 A | 8/1994 | Genise et al. |
| 5,370,013 A | 12/1994 | Reynolds et al. |
| 5,390,561 A | 2/1995 | Stine |
| 5,435,212 A | 7/1995 | Menig |
| 5,582,558 A | 12/1996 | Palmeri et al. |
| 5,651,292 A | 7/1997 | Genise |
| 5,661,998 A | 9/1997 | Genise |
| 5,743,143 A | 4/1998 | Carpenter et al. |
| 5,755,639 A | 5/1998 | Genise et al. |
| 5,766,111 A | 6/1998 | Steeby et al. |
| 5,791,189 A | 8/1998 | Newbigging |
| 5,911,787 A | 6/1999 | Walker |
| 5,938,711 A | 8/1999 | Steeby et al. |
| 5,974,906 A | 11/1999 | Stine et al. |
| 5,989,155 A | 11/1999 | Wadas et al. |
| 6,007,455 A | 12/1999 | Steeby |
| 6,015,366 A | 1/2000 | Markyvech et al. |
| 6,044,721 A | 4/2000 | Genise |
| 6,109,126 A * | 8/2000 | Cochran et al. .......... 74/336 R |
| 6,520,040 B2 * | 2/2003 | Cox ........................ 74/336 R |

\* cited by examiner

*Primary Examiner*—Dirk Wright
(74) *Attorney, Agent, or Firm*—Rader, Fishman & Grauer PLLC (57) ABSTRACT

A control for enhanced range shifting in a computer (48) assisted vehicular compound transmission having a main section (16A) shifted by a manually operated shift lever (31) and a range section (16B) shifted in response to operation of a range shift selector, such as sensing shift lever (31) passing through a predetermined actuation point (AR) in the shift pattern. During a compound up-shift, if the vehicle reaches a speed greater than a predetermined value during a coasting condition and the shift lever is in a low range neutral position, then the range section up-shift is automatically completed without undue wear or damage to the range section synchronized clutch (130). It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

10 Claims, 6 Drawing Sheets

AUTOMATIC RANGE UP-SHIFT CONTROL AND METHOD OF OPERATION

BACKGROUND OF THE INVENTION

1. Field of the Invention

The present invention relates to a control system/method for controlling range shifting in a compound transmission having a lever-shifted main section and a range section shifted by a range section actuator for selectively positioning a synchronized double-acting positive clutch. The transmission may also have a splitter section. In particular, the present invention relates to controlling range shifting in a lever-shifted, partially automated vehicular transmission system having a microprocessor-based controller for controlling the operation of a range shift actuator and/or an engine fuel control.

2. Description of the Related Art

Controller-assisted, manually shifted transmission systems are known in the prior art, as may be seen by reference to U.S. Pat. Nos. 5,582,558; 5,755,639; 5,766,111; 5,791,189; 5,974,906; 5,989,155 and 6,015,366, the disclosures of which are incorporated herein by reference.

Compound transmissions having a range and/or combined range- and splitter-type auxiliary transmission section are well known in the prior art, as may be seen by reference to U.S. Pat. Nos. 4,754,665 and 5,390,561, the disclosures of which are incorporated herein by reference.

Transmissions having manually shifted main sections and automatically shifted splitter sections are known in the prior art, as may be seen by reference to U.S. Pat. Nos. 5,435,212; 5,938,711; 6,007,455 and 6,044,721, the disclosures of which are incorporated herein by reference.

Compound transmissions having automatically implemented range shifting are well known in the prior art, as may be seen by reference to U.S. Pat. Nos. 5,911,787 and 5,974,906, the disclosures of which are incorporated herein by reference.

Drivers have been known to operate their vehicles with a main section of the transmission in neutral on downhill grades for an extended period of time.

In an exemplary range section, the high speed range to low speed range step is approximately 3½ to one. That is, when a range shift is executed from low to high, the speed of the high speed gear must be decreased by a factor of 3½ to enable synchronization. At relatively low speeds, this is achieved without significant difficult. However, at relatively high speeds, as might be experienced on highways, the energy needed to decelerate the high speed gear and the rotatably connected auxiliary unit countershafts and gears rotating therewith to synchronous speed is quite considerable. Attempting to synchronize the speeds at elevated road speeds has been identified as a source of damage to the high speed range synchronizers.

SUMMARY OF THE INVENTION

In accordance with the present invention, the drawbacks of the prior art are minimized or overcome by the provision of a range shift control for a computer-assisted mechanical transmission system that will sense vehicle operating conditions and will avoid unacceptable range up-shifts to prevent and/or minimize undue wear and/or damage to the high speed range synchronizer during a range up-shift. This is accomplished by causing range up-shifts to occur before the vehicle speed becomes unacceptably high. A range up-shift to a high range is automatically made if (i) a range up-shift has not been already initiated, (ii) a position of a shift lever is in a low range neutral position, and (iii) a vehicle speed is greater than a predetermined value, thereby preventing and/or minimizing undue wear and/or damage to the range synchronizer during a range up-shift. If a range upshift has already been initiated, then established shift protocols are invoked to complete the up-shift. Otherwise, the system continues to monitor the specified conditions to determine the need for an up-shift.

These and other aspects of the present invention will become apparent from a reading of the following description of the preferred embodiment taken in connection with the attached drawings.

DESCRIPTION OF THE PREFERRED EMBODIMENT

A computer-assisted (i.e., microprocessor-based, controller-assisted) vehicular compound mechanical transmission system 10, particularly well suited to utilize the range shift control of the present invention, may be seen by reference to FIGS. 1–4B.

Figure 1:
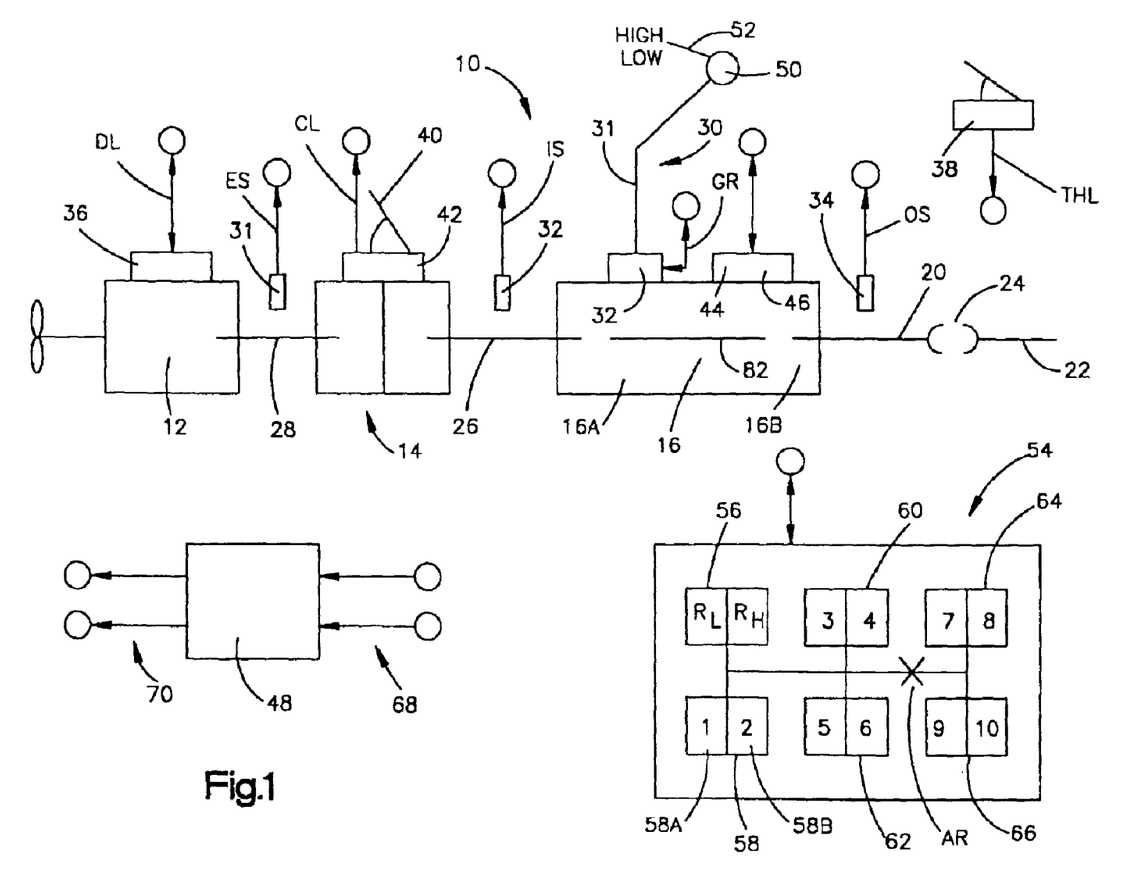
FIG. 1 is a schematic illustration of an ECU-assisted compound mechanical transmission system advantageously utilizing the range shifting control of the present invention.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
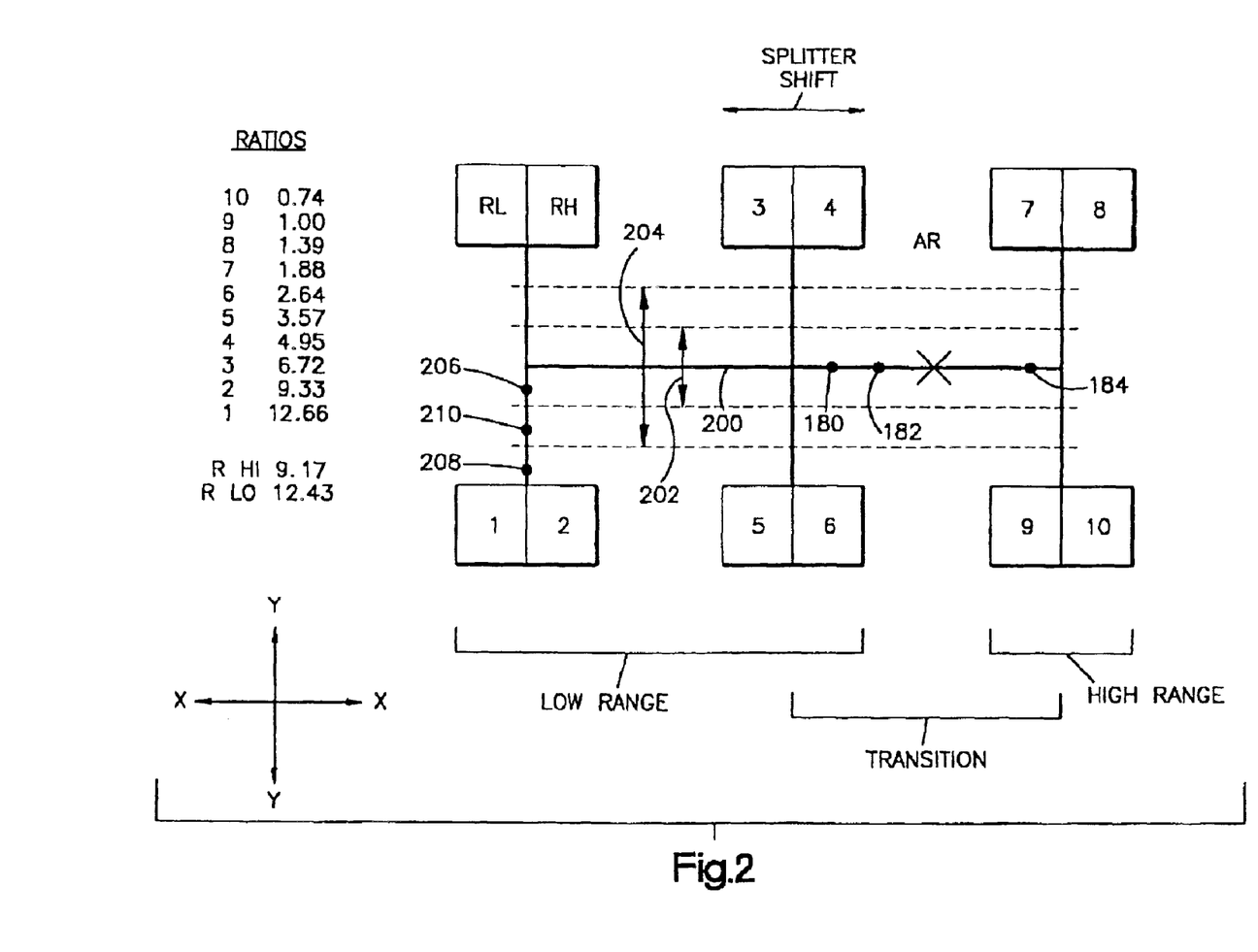
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X-X direction to select a particular ratio or ratios to be engaged and is movable in the fore and aft or Y-Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg (¾–⅝) and the righthand leg (⅞–%₁₀) of the shift pattern, it will cross a point, AR, which will actuate a mechanical or electrical range switch, or will be sensed by a position sensor, to cause automatic implementation of a range shift.

The present invention also is applicable to transmission systems of the type utilizing range shift selector switches which are manually operated independent of shift lever position, as illustrated in aforementioned U.S. Pat. No. 5,222,404.

Shifting of transmission 16, comprising main section 16A coupled in series to auxiliary section 16B, is semi-automatically implemented/assisted by the vehicular transmission system 10, illustrated in FIGS. 1–4B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system includes sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 engaged (i.e., no slip) and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an engine electronic controller, alternatively known as an engine electronic control unit, or an engine ECU 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from a transmission controller or ECU 48. The shift lever 31 has a knob 50 which contains splitter selector switch 52 by which a driver's intent to initiate a splitter shift may be sensed.

Transmission ECU 48 is preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine ECU 36, the range shift actuator and/or a display unit 54. A separate system controller may be utilized, or the engine ECU 36 communicating over an electronic data link may be utilized. A single integrated ECU might also be employed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

As shown in U.S. Pat. Nos. 5,651,292 and 5,661,998 (the disclosures of which are incorporated herein by reference), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
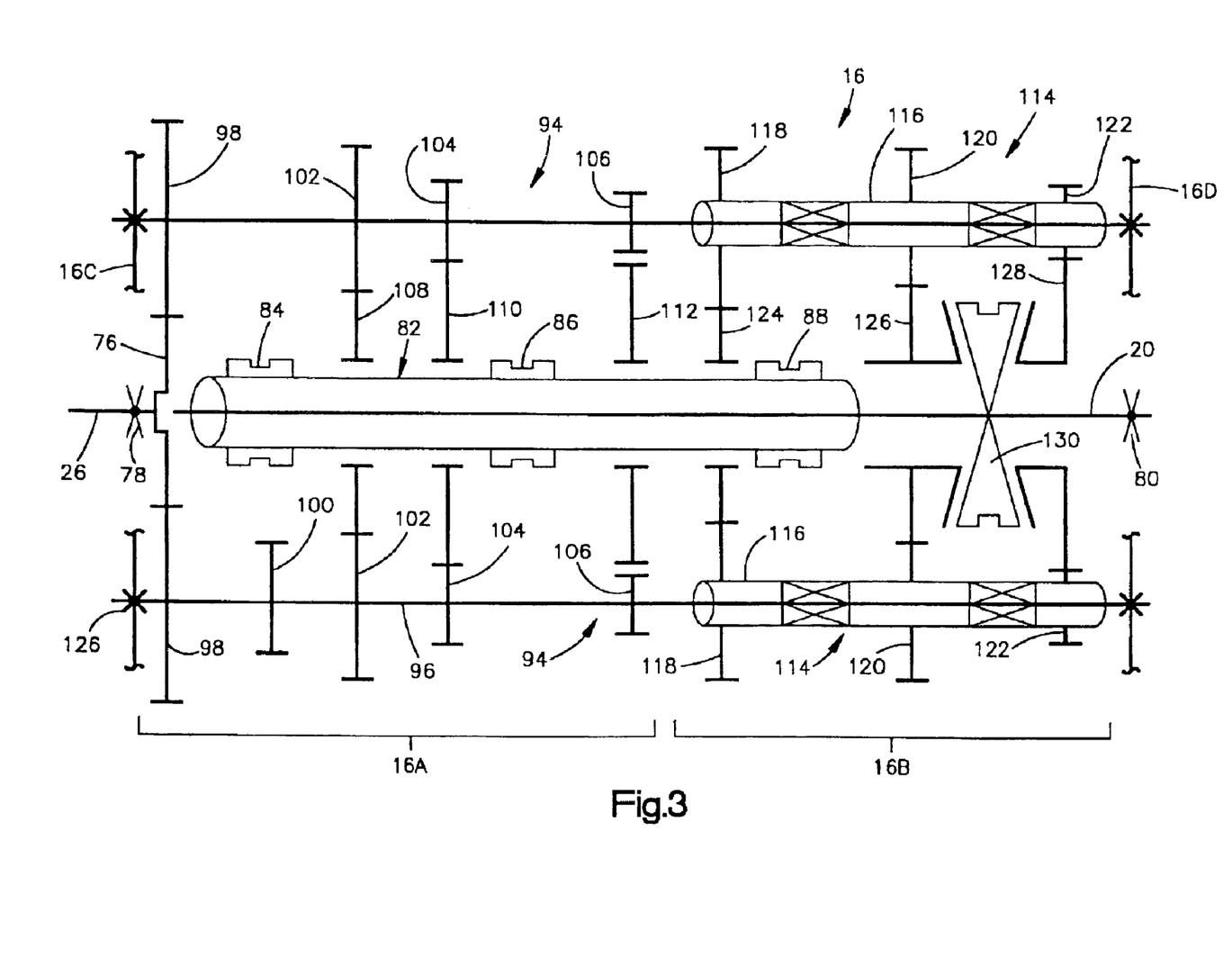
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D. In this particular embodiment an intermediate wall separating main section 16A and auxiliary section 16B is not employed, but one could be without effect on the present invention.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 4A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gear pairs 98, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. One of the countershaft assemblies 94 may include a gear 100, commonly known as a power take-off gear.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998).

Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either of the range and splitter piston actuators may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725. Alternatively, a driver operator switch could be employed to initiate range shifting. Such shifting may only be initiated with the main section 16A in neutral.

To protect the range synchronizers, a properly executed range shift should occur in the sequence of (i) disengaging the main section by shifting to main section neutral, (ii) then initiating and completing the range section shift, and (iii) then, after the range section shift is completed, engaging the main section in the appropriate ratio.

As is known in the prior art, range clutch damage, also called "range synchronizer burnout," is most likely to occur in three situations: (i) if the main section is engaged prior to completion of a range up-shift, (ii) if the main section is engaged prior to completion of a range downshift, or (iii) if a range downshift is attempted at too high a vehicle speed. The reason for synchronizer damage in situations (i) and (ii) is that with the transmission in gear, the synchronizer simply lacks the capacity to achieve synchronization. Similarly, but less obviously, the high speed range synchronizer lacks the capacity to decelerate high speed gear 126, and the associated elements including countershaft assemblies 114, gears 124 and 128, and shaft 82. Under normal operating conditions, the shift form low range to high range occurs at a relatively low speed, well within the torsional energy/capacity of synchronizer 130. However, if an extended downhill coast is initiated with the transmission in neutral and synchronizer 130 in the low range position, the high range side of synchronizer 130 may be damaged in an attempt to shift into range high. Under normal circumstances associated with driving the vehicle under engine torque, an upshift would generally be initiated at the very least at the maximum engine speed. If the maximum engine speed were 2600 RPM, and the range high to range low speed ratio is 3.5:1, then the synchronizer, in an extreme situation, might need to bring the high range gear down from about 1100 RPM to about 300 RPM, a 700 RPM differential. However, in a coasting condition, at freeway speeds, the synchronizer might be forced to attempt decelerating the high range gear from about 3000 RPM down to 900 RPM, a 2100 RPM differential. As will be discussed below, the range shift control of the present invention is effective to minimize or eliminate damage under such occurrences and to allow rapid and dependable completion of permissible range shifts.

The position of the shift lever 31 or of the shifting mechanism 32 controlled thereby may be sensed by a position sensor device. Various positioning sensing assemblies are known in the prior art, with a preferred type illustrated in allowed U.S. Pat. No. 5,743,143, assigned to the assignee of this application, the disclosure of which is incorporated herein by reference.

Figure 4A:
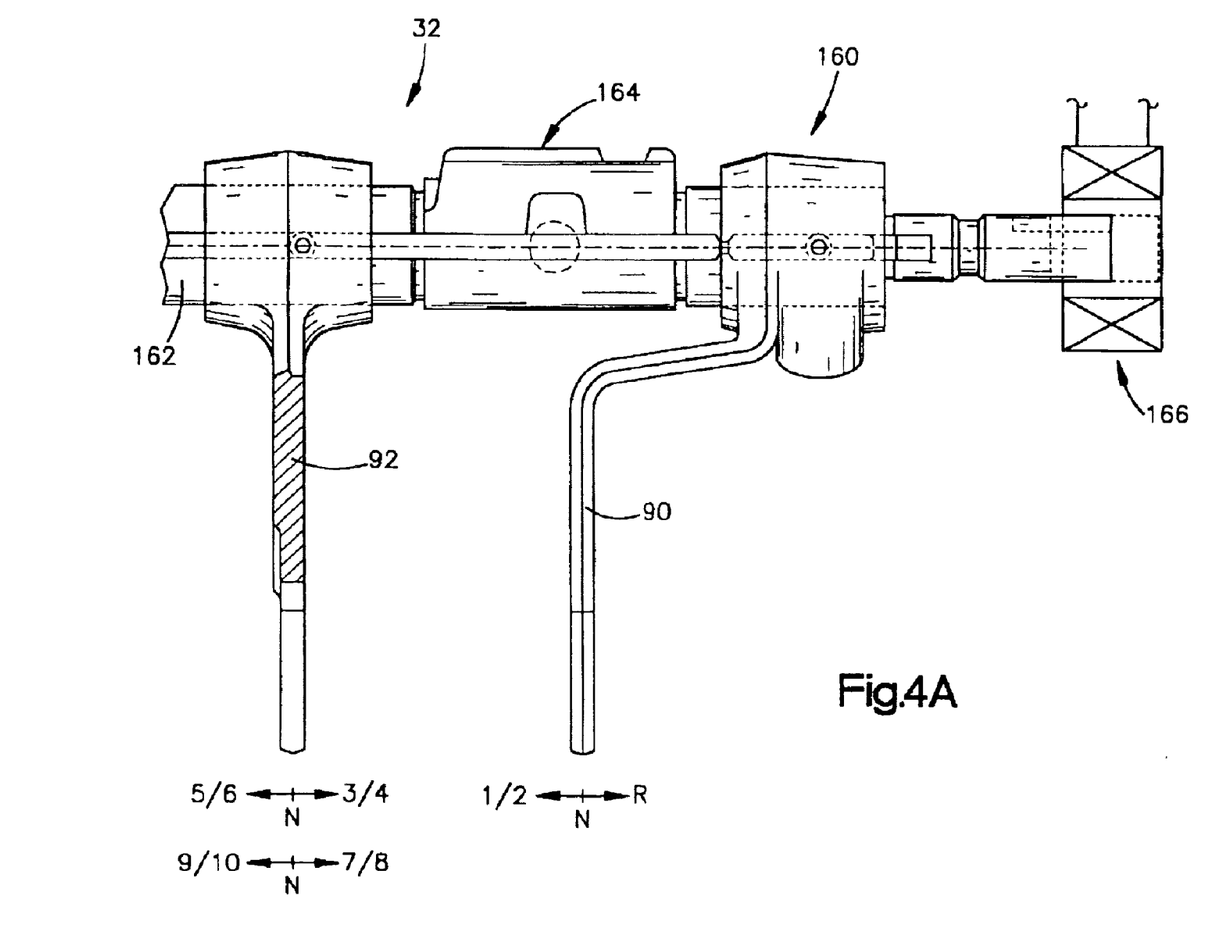
FIGS. 4A and 4B are schematic illustrations of a shift shaft position sensor mechanism for use in the system of FIG. 1.
Figure 4B:
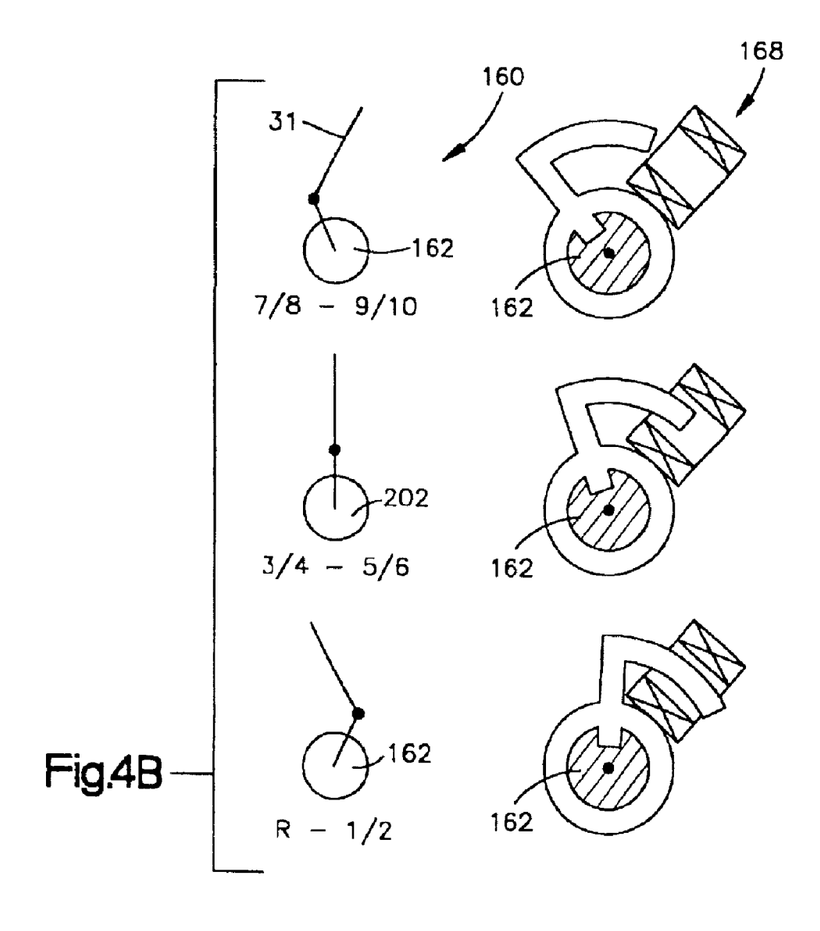

Referring to FIGS. 4A and 4B, shifting mechanism 32 is illustrated as a single shift shaft device 160 having a shaft 162 which is rotatable in response to X-X movements of shift lever 31 and axially movable in response to Y-Y movements of shift lever 31. Mechanisms of this type are described in detail in aforementioned U.S. Pat. No. 4,920,815.

Shift shaft 162 carries the main section shift forks 90 and 92 for selective axial movement therewith and a shift block member 164 for receiving a shift finger or the like. A pair of coils 166 and 168 provides a pair of signals (collectively GR) indicative of the axial and rotational position of shaft 162 and, thus, of shift lever 31 relative to the shift pattern illustrated in FIG. 2. The rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions. It should be appreciated that, for the purposes of the presentation, a position indicator switch or switches may be employed in place of position sensor devices.

If in first (1st) through fourth (4th), a shift into high range is considered unlikely, and the auto range shift initiation point may be moved to position 184 (away from the expected shift lever path) to prevent inadvertent actuation of a range shift. If in sixth (6th) with a high engine speed, a shift into high range is likely. Accordingly, moving the auto range initiation point to position 180 when in sixth gear will allow for a quicker initiation of a range shift.

The state of engagement (i.e., engaged or neutral) of the main transmission section 16A is an important control parameter for system 10. By way of example, if main section neutral is incorrectly sensed, the range clutch may be commanded to an inappropriate up-shift, potentially damaging the range synchronizer. It is therefore important to prevent or minimize false determinations of main section neutral and/or engaged conditions.

Referring to FIG. 2, a first narrow band 202 and a second wider band 204 of vertical displacements from the neutral gate portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change. Alternate means of sensing neutral, such as position switches, may be employed for the purposes of the present invention. However, it should be appreciated that position sensors beneficially are capable of providing information which enable more precise control of shifting.

Vehicle operating conditions other than or in addition to currently engaged or neutral condition of the main section 16A may be used to vary the width of the neutral sensing bands.

Figure 5:
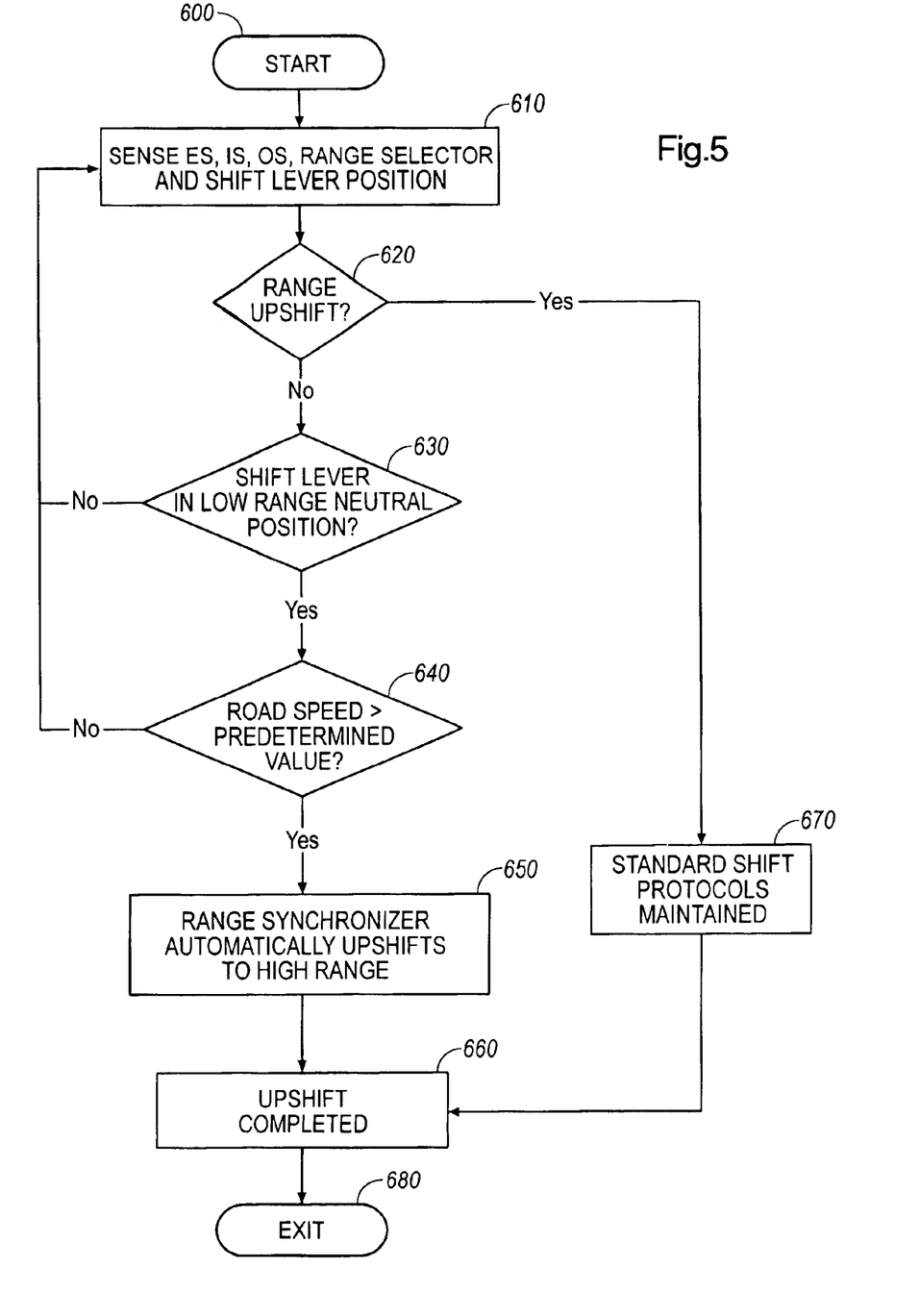
FIG. 5 is a schematic illustration, in flow chart format, of the range shift control of the present invention.

According to one aspect of the invention, as shown in FIG. 5, a protocol for range shift control in the controller-assisted manually shifted vehicular transmission system 10 is described. The protocol begins at step 600. Vehicle operating conditions are sensed, such as engine speed ("ES"), input shaft speed ("IS"), output shaft speed ("OS"), range selector and shift lever position in step 610. Then, a determination is made in step 620 as to whether a range up-shift has been selected, typically by either an evaluation of the position of shift lever 31, or alternatively an evaluation of the state of a range shift switch. If an up-shift has been selected, then the system reverts to or maintains the standard shift protocols already installed within the transmission system 10 in step 670, the up-shift is completed in step 660, and the protocol exits at step 680. If in step 620 a range up-shift has not been selected, then the protocol proceeds to step 630 and a determination is made whether the shift lever is in a low range neutral position. If the shift lever is not in low range neutral position, then the protocol returns to step 610, updates the sensed parameters, and recycles through the inquires and commands of the protocol.

If in step 630 the shift lever is in low range neutral position, thereby indicating that the vehicle is in a coasting condition, then the protocol proceeds to step 640 and a determination is made whether the vehicle speed is high enough to warrant a range up-shift. If for example, the road speed of the vehicle is greater than a predetermined value, then a command is issued to automatically up-shift the range synchronizer from the low range to high range. A coasting condition is defined as a condition in which the engine and the vehicle are drivingly disconnected, as when the transmission is in neutral, and yet the vehicle is moving. The predetermined value is defined as the road speed of the vehicle at which the range synchronizer 130 would be rotating at least at the rotational speed corresponding to the maximum engine speed (determined by manufacturer's specifications) for a given main section gear ratio plus approximately five hundred (500) RPM. The main section gear ratio chosen is for 3rd gear if the splitter low gear is chosen, and for 4th gear if the splitter high gear is chosen. If the predetermined value is determined to be exceeded, then the protocol proceeds to step 650 and the range synchronizer automatically up-shifts from low range to high range, the up-shift is completed in step 660 and the protocol exits in step 680. Alternatively, step 640 of the protocol can be satisfied using a calculated engine speed, rather than road speed of the vehicle as the target. Specifically, step 640 is satisfied if the calculated synchronous engine speed corresponding to the measured output shaft speed is greater than or equal to the maximum engine speed plus approximately five hundred (500) RPM for the existing gear ratio. The calculated synchronous engine speed is determined based on the output shaft speed ("OS") and the $3^{rd}$ gear ratio for splitter low, and the $4^{th}$ gear ratio for the splitter high. It is appreciated that using a factor other than vehicle speed which varies with vehicle speed, such as output shaft speed, or calculated engine speed, or countershaft speed, or the like are equivalent to vehicle speed for the purpose of establishing when to execute a range up-shift.

On the other hand, if the vehicle speed is less than the predetermined value in step 640, for example, if the vehicle speed is too low, i.e., the vehicle speed is less than a predetermined value during a coasting condition, an automatic range up-shift to complete the up-shift is not permissible and the protocol returns to step 610 and continues on through the protocol. It should be appreciated that the system is able to loop through the above described protocol at a relatively high frequency, at a rate of about once every 10 milliseconds.

Accordingly, it may be seen that a new and improved range shift control for a computer-assisted, lever-shifted transmission system is provided, which provides protection against undue wear and/or damage to the range synchronized clutch assembly.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for controlling range shifting in a vehicular transmission system, said method comprising:

determining (i) if a range up-shift has been initiated, (ii) if a position of a shift lever is in a low range neutral position, and (iii) if a vehicle speed is greater than a predetermined value; and automatically performing an up-shift of the vehicular transmission system to a high range if said determining step determines (i) that the range up-shift has not been initiated, (ii) that the shift lever is in the low range neutral position, and (iii) the vehicle speed is greater than the predetermined value.

2. The method of claim 1, wherein the predetermined value is defined as a road speed greater than or equal to that corresponding to a maximum engine speed plus approximately five hundred RPM for a low range gear ratio in a predetermined main section gear.

3. The method of claim 2, wherein the vehicular transmission system includes a splitter section, and the same predetermined main section gear is employed in calculating the predetermined value so long as the shift lever is in a low range neutral position, and a ratio of a selected splitter gear is also employed in calculating the predetermined value.

4. The method of claim 1, wherein the up-shift is performed by standard shift protocols if the range up-shift has been initiated.

5. The method of claim 1 wherein if the position of the shift lever is not in neutral, then no up-shift to range high is performed, and the transmission system continues to monitor the shift lever position and the vehicle.

6. A controller-assisted, manually shifted vehicular transmission system comprising an internal combustion engine driving an input shaft of a compound transmission having a multiple-ratio main section shifted by a shift lever manually movable in a shift pattern and a splitter auxiliary section connected in series with said main section, a splitter shift mechanism for automatically implementing splitter shifts and a controller for receiving input signals indicative of system operating conditions and for processing same according to predetermined logic rules to issue command output signals to system actuators, including said splitter shift mechanism, wherein said controller includes logic rules for:

determining (i) if a range up-shift has been initiated, (ii) if a position of a shift lever position is in a low range neutral position, and (iii) if a vehicle speed is greater than a predetermined value; and automatically performing an up-shift of the vehicular transmission system from a low range to a high range if said determining step determines (i) that the range up-shift has not been initiated, (ii) that the shift lever is in the low range neutral position, and (iii) the vehicle speed is greater than the predetermined value.

7. The method of claim 6, wherein the predetermined value is defined as a road speed greater than or equal to that corresponding to a maximum engine speed plus approximately five hundred RPM for a low range gear ratio in a predetermined main section gear.

8. The method of claim 6, wherein the vehicular transmission system includes a splitter section, and the same predetermined main section gear is employed in calculating the predetermined value so long as the shift lever is in a low range neutral position, and a ratio of a selected splitter gear is also employed in calculating the predetermined value.

9. The method of claim 6, wherein the up-shift is performed by standard shift protocols if the range up-shift has been initiated.

10. The method of claim 6 wherein if the position of the shift lever is not in neutral, then no up-shift to range high is performed, and the transmission system continues to monitor the shift lever position and the vehicle.

* * * * *